(12) United States Patent
Yamamoto et al.

(10) Patent No.: US 6,589,901 B2
(45) Date of Patent: Jul. 8, 2003

(54) EXHAUST GAS PURIFYING CATALYST AND METHOD OF PRODUCING SAME

(75) Inventors: Shinji Yamamoto, Kanagawa (JP); Masahiro Takaya, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 15 days.

(21) Appl. No.: 09/979,302

(22) PCT Filed: Mar. 28, 2001

(86) PCT No.: PCT/JP01/02546

§ 371 (c)(1),
(2), (4) Date: Nov. 21, 2001

(87) PCT Pub. No.: WO01/80979

PCT Pub. Date: Nov. 1, 2001

(65) Prior Publication Data

US 2002/0198098 A1 Dec. 26, 2002

(30) Foreign Application Priority Data

Apr. 26, 2000 (JP) ......................................... 2000-125696

(51) Int. Cl.[7] ........................... B01J 29/06; B01J 29/068
(52) U.S. Cl. ........................... 502/65; 502/63; 502/64; 502/66; 502/73; 502/74; 502/71; 502/77; 502/78; 502/79
(58) Field of Search ........................... 502/63, 64, 65, 502/66, 73, 74, 71, 77, 78, 79

(56) References Cited

U.S. PATENT DOCUMENTS

| 4,374,044 | A |   | 2/1983  | Schaefer et al. |         |
|-----------|---|---|---------|-----------------|---------|
| 5,202,299 | A |   | 4/1993  | Symons et al.   |         |
| 5,330,945 | A | * | 7/1994  | Beckmeyer et al.| 502/66  |
| 5,407,880 | A |   | 4/1995  | Ikeda et al.    |         |
| 5,583,081 | A | * | 12/1996 | Price et al.    | 502/61  |
| 5,676,912 | A |   | 10/1997 | Sharma et al.   |         |
| 6,080,375 | A | * | 6/2000  | Mussmann et al. | 423/213.5 |
| 6,155,073 | A | * | 12/2000 | Gray            | 62/480  |

FOREIGN PATENT DOCUMENTS

| EP | 0 716 877    | * | 6/1996 |
|----|--------------|---|--------|
| EP | 0 852 966 A1 |   | 7/1998 |
| EP | 0 976 916 A2 |   | 2/2000 |
| JP | 2-56247 A    |   | 2/1990 |
| JP | 5-59942 A    |   | 3/1993 |
| JP | 6-74019 A    |   | 3/1994 |
| JP | 6-142457 A   |   | 5/1994 |
| JP | 7-102957 A   |   | 4/1995 |
| JP | 7-144119 A   |   | 6/1995 |

\* cited by examiner

*Primary Examiner*—Tom Dunn
*Assistant Examiner*—Christina Ildebrando
(74) *Attorney, Agent, or Firm*—Foley & Lardner

(57) ABSTRACT

An exhaust gas purifying catalyst for exhaust gas discharged from an automotive internal combustion engine. The catalyst comprises a substrate over which a hydrocarbons adsorbing material layer is formed as a lower layer to absorb hydrocarbons contained in exhaust gas. The hydrocarbons adsorbing material layer contains zeolite and colloidal silica which has undergone firing. The colloidal silica is in a chain-like form and/or a spherical form before and after the firing. Additionally, a catalyst component layer is formed as an upper layer over the hydrocarbons adsorbing material layer. The catalyst component layer contains a catalyst metal.

13 Claims, 4 Drawing Sheets

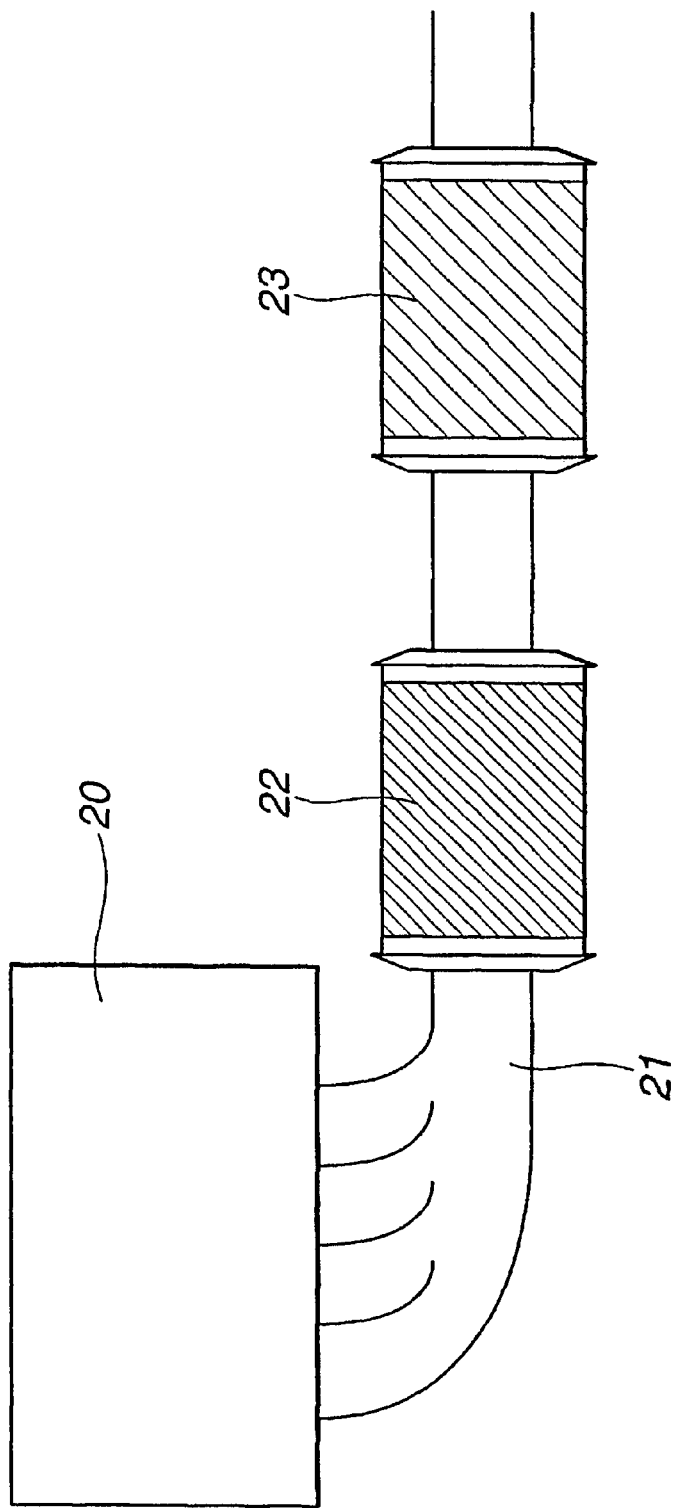

EXHAUST GAS PURIFYING CATALYST AND METHOD OF PRODUCING SAME

TECHNICAL FIELD

This invention relates to improvements in an exhaust gas purifying catalyst and a method of producing the same, and more particularly to the exhaust gas purifying catalyst for purifying exhaust gas discharged from an internal combustion engine so as to remove hydrocarbons (IC), carbon monoxide (CO) and nitrogen oxides (NOx) contained in exhaust gas, particularly effectively removing hydrocarbons. The exhaust gas purifying catalyst is effective, for example, for purifying exhaust gas discharged from the engine of an automotive vehicle or the like in a cold engine operation range (where exhaust gas temperature is low) immediately after engine starting, particularly removing hydrocarbons at a high efficiency.

BACKGROUND ART

In recent years, a so-called HC adsorbing catalyst has been developed for the purpose of removing a large amount of hydrocarbons generated in a low engine temperature range during engine starting of an internal combustion engine. The HC adsorbing catalyst includes a HC adsorbing material layer containing zeolite as a main component, and a three-way catalyst component layer which are coated over a monolithic substrate. With such a HC adsorbing catalyst, the HC adsorbing material layer is adapted to temporarily adsorb and retain a large amount of HC generated in the low exhaust gas temperature range or during engine starting in which the three-way catalyst cannot effectively function. Thereafter, the adsorbed and retained HC is gradually released or desorbed from the HC adsorbing material layer and oxidized to be removed when exhaust gas temperature rises to activate the three-way catalyst component.

Now, in the above HC adsorbing catalyst, there is an interrelation between kind of hydrocarbons (HC) in exhaust gas and pore diameters of the zeolite, and therefore it is required to use the zeolite having suitable pore diameters for the kind of hydrocarbons to be adsorbed. In view of this, MFI (zeolite) as a main component is blended with other zeolite having different pore diameters (for example, USY-type zeolite) so as to obtain a HC adsorbing catalyst component whose pore diameter distribution is adjusted. However, since stability of the crystal structure and degree of deformation of pores are different depending upon kind of zeolites under temperatures and in the presence of water vapor, difference in adsorption and desorption characteristics is enlarged among kinds of the zeolites after a long time use (or durability test) so that adsorption and retention ability for hydrocarbons in exhaust gas may become insufficient.

In view of the above, in order to ensure an adsorbing performance for hydrocarbons, using a heat-resistant zeolite having a high silica-alumina ratio (Si/2Al ratio) has been proposed. Such zeolite is called a "high-silca zeolite".

Concerning the three-way catalyst component, it has been proposed that noble metals such as rhodium (Rh), platinum (Pt) and palladium (Pd) coexist in the same layer coated on a substrate, or that Ph and Pd exist respectively in separate layers coated over a substrate. In this regard, Japanese Patent Provisional Publication No. 2-56247 has proposed an exhaust gas purifying catalyst in which a second layer containing the noble metals such as Rh, Pt and Pd as a main component is formed on a first layer containing zeolite as a main component.

Additionally, in order to-lower the concentration of HC in exhaust gas discharged in a low engine temperature condition made immediately after engine starting, it has been proposed that HC is temporarily stored in a HC adsorbing material and released after a three-way catalyst disposed downstream of the HC adsorbing material has been activated thereby to oxidize the released HC. Such proposition is disclosed in Japanese Patent Provisional Publication Nos. 6-74019, 7-144119, 6-142457, 5-59942, and 7-102957.

DISCLOSURE OF INVENTION

However, with the above conventional HC adsorbing catalysts, when the crystal structure of zeolite is broken and deformation of pores in zeolite is promoted in the HC adsorbing material layer after a long time use, the absorbed HC is unavoidably released from zeolite before the three-way catalyst components in the three-way catalyst component layer as an upper layer is activated. Consequently, the oxidizing efficiency for the released HC is sharply lowered so that the HC adsorbing catalyst cannot function as an exhaust gas purifying catalyst.

Besides, it is effective to increase the Si/2Al ratio of zeolite and introduce polyvalent metal into the zeolite frame in order to improve heat resistance of zeolite. However, use of a high silica zeolite increases a hydrophobic property of surface of zeolite particles thereby largely lowering a bonding ability of zeolite particles with an inorganic binder. Accordingly, zeolite unavoidably separates and settles in an aqueous slurry thereby degrading a coating characteristics of the slurry. Additionally, after a long time use, the bonding force between the HC adsorbing material layer and the three-way catalyst component layer is sharply lowered so that the three-way catalyst component layer may peels off from and separates from the substrate. As a result, it is impossible to equally effectively remove all of HC, CO and NOx.

Furthermore, with exhaust gas purifying systems including the HC adsorbing catalyst disclosed in the above Japanese Provisional Publications, the durability of the HC adsorbing material is insufficient, and therefore a HC adsorbing ability of the HC adsorbing material is lowered after a long time use. Additionally, the HC absorbed in the upstream stage HC adsorbing material is released before the downstream stage three-way catalyst has been activated, thereby degrading an exhaust emission condition. In this regard, in order to improve the adsorbing ability of the HC adsorbing material and to accomplish retardation of HC releasing, it has been proposed to cause high temperature exhaust gas to flow through a bypass passage provided with the HC adsorbing material, or to preheat exhaust gas containing released HC by means of a heat exchanger prior to introduction of exhaust gas to the three-way catalyst.

However, these measures make the exhaust gas purifying systems complicated while sharply increasing production cost of the systems although sufficient effects for equally removing HC, CO and NOx cannot be obtained. Thus, development of the HC adsorbing material which is high in durability and HC adsorbing ability has been eagerly desired.

It is an object of the present invention to provide an improved exhaust gas purifying catalyst and a method of producing the same catalyst, which can effectively overcome drawbacks encountered in conventional exhaust gas purifying catalysts.

Another object of the present invention is to provide an improved exhaust gas purifying catalyst and a method of producing the same catalyst, which can effectively purify exhaust gas throughout a long period of time.

Another object of the present invention is to provide an improved exhaust gas purifying catalyst and a method of producing the same catalyst, which can effectively oxidize or remove a high concentration of HC emitted in a cold engine operation range or immediately after engine starting while effectively preventing a HC adsorbing material (HC adsorbing catalyst component) from peeling off and separating from a substrate even after a long time use of the exhaust gas purifying catalyst.

An aspect of the present invention resides in an exhaust gas purifying catalyst which comprises a substrate. A hydrocarbons adsorbing material layer for adsorbing hydrocarbons contained in exhaust gas is formed as a lower layer over the substrate and contains zeolite and colloidal silica which has undergone calcining. The colloidal silica is in a chain structure and/or a spherical structure before and after the calcining. Additionally, a catalyst component layer is formed as an upper layer over the hydrocarbons adsorbing material layer. The catalyst component layer contains a catalyst metal.

Another aspect of the present invention resides in an exhaust gas purifying catalyst which comprises a substrate. A hydrocarbons adsorbing material layer for adsorbing hydrocarbons contained in exhaust gas is formed as a lower layer over the substrate and contains zeolite and silica particle. The silica particle adheres to surface of zeolite and is in a chain structure and/or a spherical structure. Additionally, a catalyst component layer is formed as an upper layer over the hydrocarbons adsorbing material layer. The catalyst component layer contains a catalyst metal.

A further aspect of the present invention resides in an exhaust gas purifying catalyst which comprises a substrate. A hydrocarbons adsorbing material layer for adsorbing hydrocarbons contained in exhaust gas is formed as a lower layer over the substrate and contains zeolite and silica particle. The hydrocarbons adsorbing material layer is formed by coating a coating liquid containing zeolite and colloidal silica which is in a chain structure and/or a spherical structure, over the substrate. Additionally, a catalyst component layer is formed as an upper layer over the hydrocarbons adsorbing material layer. The catalyst component layer contains a catalyst metal.

A still further aspect of the present invention resides in an exhaust gas purifying catalyst which comprises a substrate. A hydrocarbons adsorbing material layer for adsorbing hydrocarbons contained in exhaust gas is formed as a lower layer over the substrate and containing zeolite and colloidal silica which has undergone calcining. The zeolite has undergone a treatment for providing hydrophobic property with mesoporous silica. The colloidal silica is a chain structure and/or a spherical structure before and after the calcining. The colloidal silica has an average particle size ranging from 5 to 100 nm before the calcining. The colloidal silica is contained in an amount ranging from 1 to 50% by weight relative to the hydrocarbons adsorbing material layer after the calcining. Additionally, a catalyst component layer is formed as an upper layer over the hydrocarbons adsorbing material layer. The catalyst component layer contains a catalyst metal.

A still further aspect of the present invention resides in a method of producing an exhaust gas purifying catalyst. The method comprises (a) coating a first coating liquid over a substrate to form a hydrocarbons adsorbing material layer as a lower layer, the first coating liquid containing zeolite and colloidal silica which is in a chain structure and/or a spherical structure; and (b) coating a second coating liquid on the hydrocarbons adsorbing material layer to form a catalyst component layer as an upper layer, the second coating liquid containing a catalyst metal.

BRIEF DESCRIPTION OF DRAWINGS

FIG. 4 is a schematic view of an emission performance evaluation system by which evaluation (in emission performance) for the exhaust gas purifying catalysts of the present invention was conducted.

THE BEST MODE FOR CARRYING OUT THE INVENTION

According to the present invention, an exhaust gas purifying catalyst comprises a substrate. A hydrocarbons adsorbing material layer for adsorbing hydrocarbons contained in exhaust gas is formed as a lower layer over the substrate and contains zeolite and colloidal silica which has undergone calcining. The colloidal silica is in a chain structure and/or a spherical structure before and after the calcining. Additionally, a catalyst component layer is formed as an upper layer over the hydrocarbons adsorbing material layer. The catalyst component layer contains a catalyst metal.

The exhaust gas purifying catalyst of the present invention is produced by first forming the hydrocarbons adsorbing layer and subsequently forming the catalyst metal layer over the substrate. In other words, the exhaust gas purifying catalyst of the present invention is produced by a method comprising (a) coating a first coating liquid over the substrate to form the hydrocarbons adsorbing material layer as the lower layer, the first coating liquid containing zeolite and colloidal silica which is in a chain structure and/or a spherical structure; and (b) coating a second coating liquid on the hydrocarbons adsorbing material layer to form the catalyst component layer as the upper layer, the second coating liquid containing a catalyst metal.

Figure 3A:
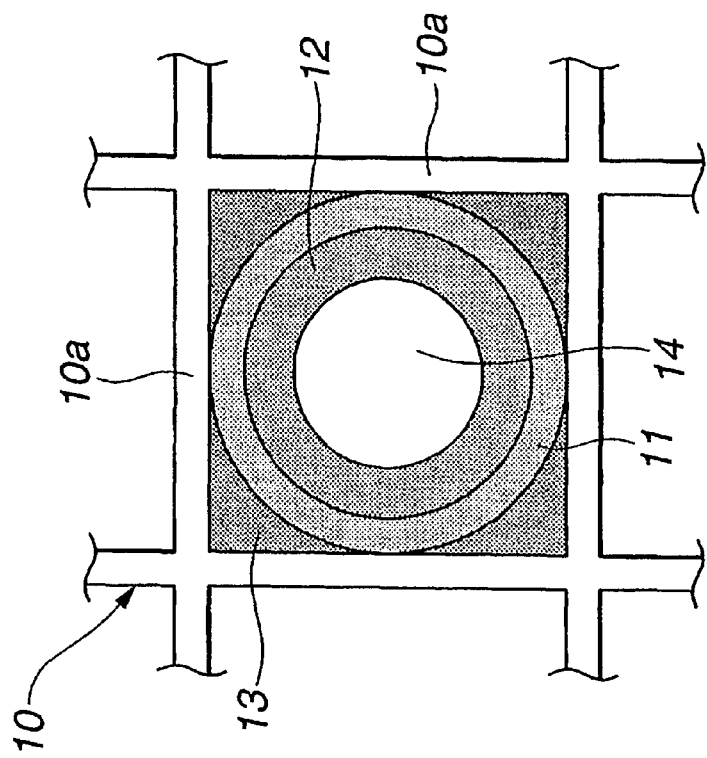
FIG. 3A is a fragmentary sectional view of an example of an exhaust gas purifying catalyst in accordance with the present invention, showing a coat layer structure formed in a cell of a monolithic substrate.

Referring now to FIG. 3A, a part of an embodiment of the exhaust gas purifying catalyst according to the present invention is illustrated. In this embodiment, the exhaust gas purifying catalyst comprises a honeycomb-type monolithic substrate 10 which is formed with a plurality of axially extending cells C. Each cell C is defined by thin walls 10a.

A hydrocarbons (HC) adsorbing material layer 11 is formed or coated on the surface of the cell wall 10a so as to serve as a first or lower layer. The HC adsorbing material layer 11 contains β-zeolite as a main component. Additionally, a catalyst (three-way catalyst) component layer 12 is formed or coated on the surface of the HC adsorbing material layer 11 so as to serve as a second or upper layer. The catalyst component layer 12 contains a three-way catalyst which can oxidize HC and CO and reduce NOx. A gas passage 14 is defined inside or at the surface of the catalyst component layer 12, so that exhaust gas flows through the gas passage 14. Accordingly, the exhaust gas purifying catalyst can effectively exhibit both a hydrocarbon adsorbing and releasing ability for adsorbing and releasing hydrocarbons and a HC oxidizing ability for oxidizing hydrocarbons which has been released. In other words, the HC adsorbing material layer functions as a trap for trapping HC while the catalyst component layer 12 may function to absorb or trap NOx and function as a three-way catalyst. Thus, the exhaust gas purifying catalyst of the present invention sufficiently functions as a three-way catalyst thereby accomplishing exhaust emission reduction not only in a cold engine operation range (where engine warm-up has not been completed so that exhaust gas temperature is low) but also in a hot engine operation range (where engine warm-up has been completed so that exhaust gas temperature is high). In this case, exhaust gas is discharged from an internal combustion engine of an automotive vehicle.

Figure 3B:
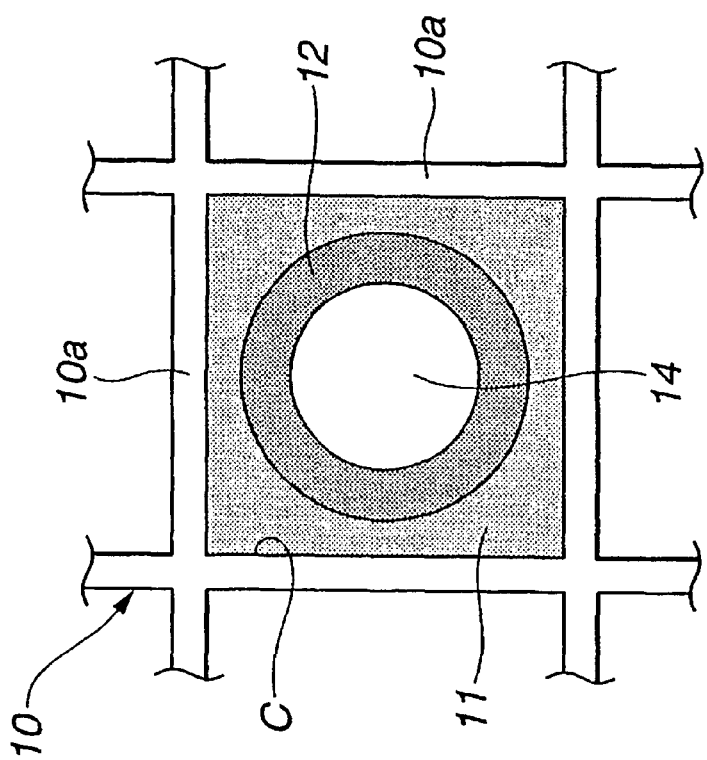
FIG. 3B is a fragmentary sectional view similar to FIG. 3A but showing another example of the exhaust gas purifying catalyst in accordance with the present invention.

Otherwise, a porous material layer 13 may be formed or coated on the surface of the cell walls 10a so as to be located below the HC adsorbing material layer 11, as shown in FIG. 3B. The porous material layer 13 contains porous material (such as alumina powder) carrying various catalyst components. Preferably, the porous material is high in heat resistance, and therefore is activated alumina (powder) having a specific surface area ranging from 50 to 300 m²/g.

The above HC adsorbing material layer 11 will be discussed in detail.

Figure 1A:
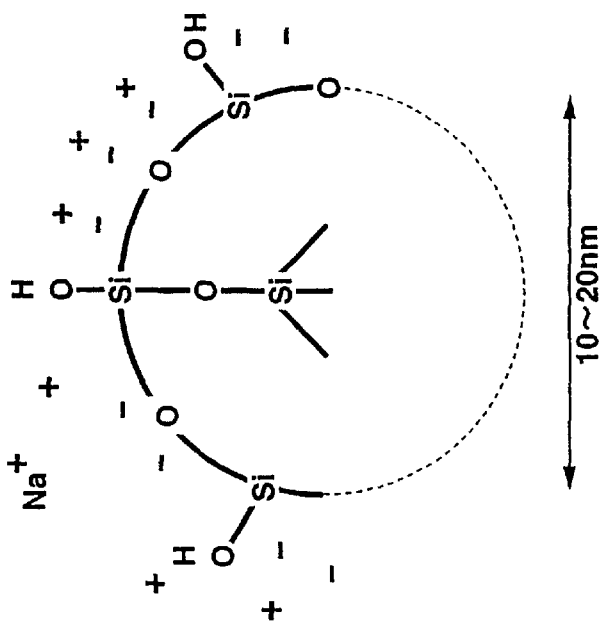
FIG. 1A is a schematic illustration showing an atomic structure of a particle of colloidal silica in connection with an exhaust gas purifying catalyst according to the present invention.
Figure 1B:
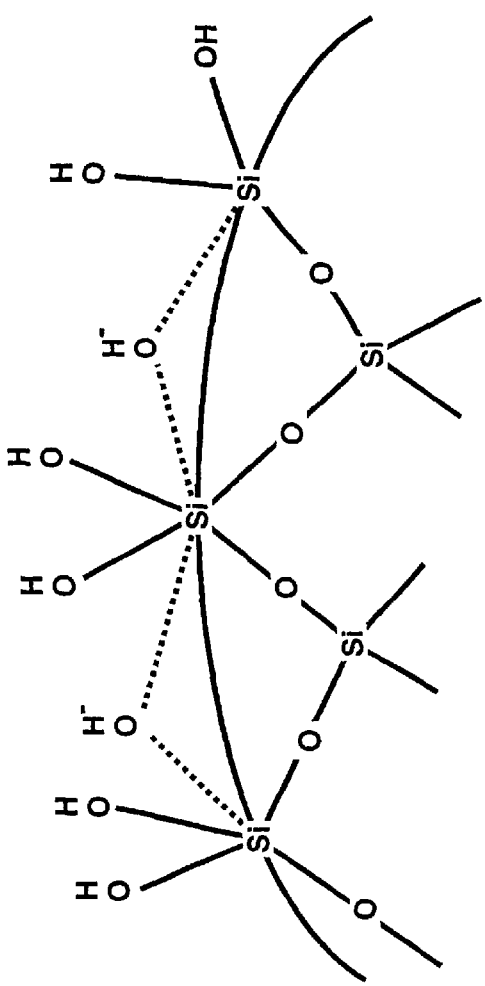
FIG. 1B is an enlarged schematic illustration showing a part of the atomic structure of FIG. 1A.
Figure 2B:
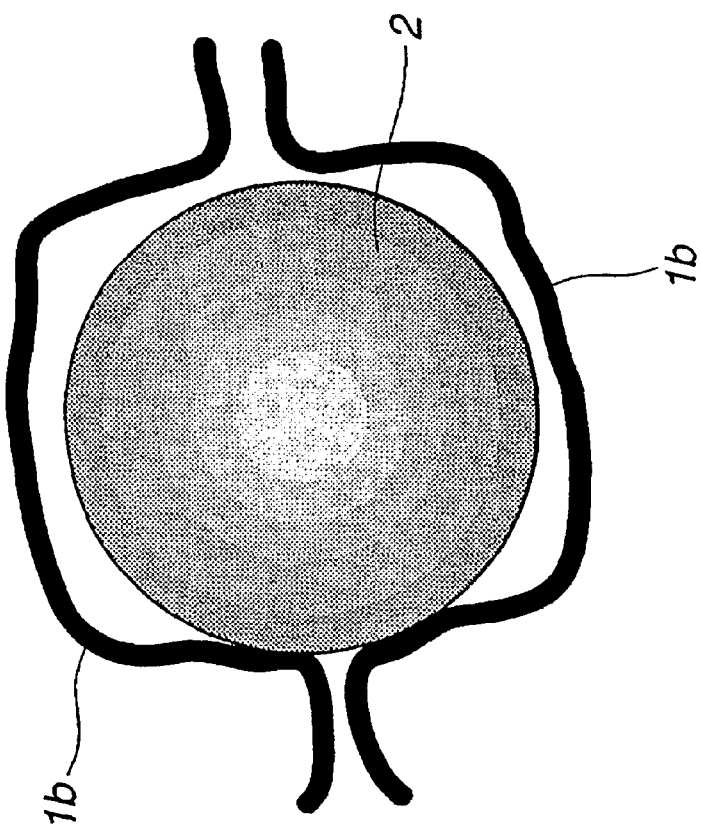
FIG. 2B is a schematic illustration showing a state in which chain particles of colloidal silica surround a particle of zeolite, in connection with the exhaust gas purifying catalyst according to the present invention.
Figure 2A:
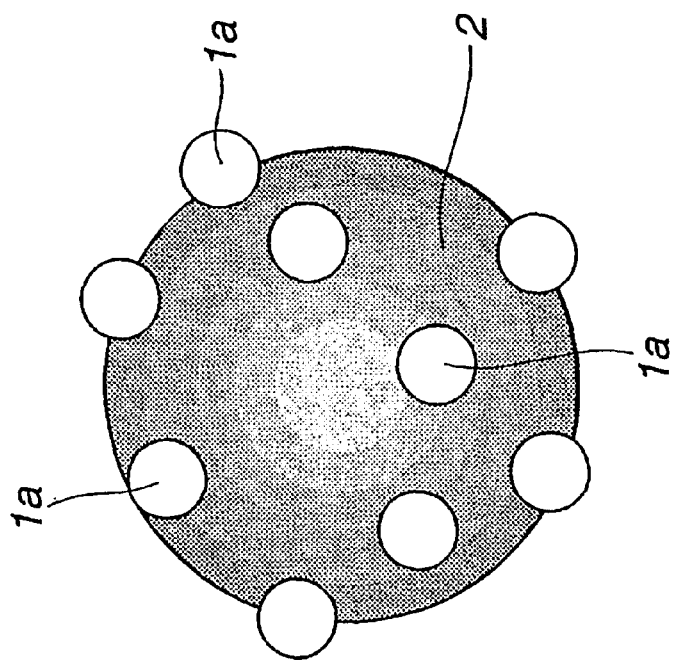
FIG. 2A is a schematic illustration showing a state in which spherical particles of colloidal silica are adhered to the surface of a particle of zeolite, in connection with the exhaust gas purifying catalyst according to the present invention.

A The HC adsorbing material layer 11 contains zeolite and colloidal silica which is in a state of having been dried and fired. The colloidal silica means silica particle in a colloidal state in which negatively charged amorphous silica particles are dispersed in water. Each of the silica particles is usually generally spherical. The colloidal silica in the HC adsorbing material layer 11 is in chain structure and/or in spherical structure, and preferably has an average particle size ranging from 5 to 100 nm in the colloidal state or before undergoing calcining. The chain structure colloidal silica 1b has an average particle size smaller than 100 nm and adheres to the surface of a particle of zeolite 2, as shown in FIG. 2B. The spherical structure colloidal silica 1a has an average particle size ranging from 10 to 20 nm and adhered to the surface of a particle of zeolite 2. as shown in FIG. 2A. The average particle size is measured by a laser diffraction scattering method using a light source of semiconductor. Here, by virtue of the particles of the colloidal silica adhered to the whole surface of each zeolite particle, a layer of silanol group (SiOH and the like) and hydroxyl ion (OH—) is formed at the surface section of zeolite particle. The particles of the colloidal silica exist taking an atomic structure (atomic frame) as shown in FIGS. 1A and 1B, in which electrical double layers are formed under the action of alkali ions. As a result, zeolite particles (with colloidal silica particles) repel each other so as to be stabilized. It will be understood that the colloidal silica in the HC adsorbing material layer 11 is also in chain structure and/or in spherical structure even after the calcining so that the forms of the colloidal silica before the calcining can be maintained even after the culcining or in a final product of the exhaust gas purifying catalyst although the colloidal silica slightly contracts in size after the calcining.

The above colloidal silica is preferably contained in an amount ranging from 1 to 50% by weight (calculated as $SiO_2$) relative to a total amount (weight) of the HC adsorbing material layer, in a condition obtained after calcining of the HC adsorbing material layer 11. Accordingly, the colloidal silica is uniformly adhered onto the surface of the zeolite particle. In other words, the colloidal silica particles are adhered on the whole surface of the zeolite particle which serves as a nucleus, in which the above electrical double layers are formed. As a result, the colloidal silica serves as an inorganic binder component.

Consequently, even when the zeolite with the colloidal silica is formed into an aqueous slurry containing highly hydrophobic zeolite, zeolite particles and water (or aqueous solution) cannot separate from each other so as to make it possible to accomplish uniform coating of zeolite over the substrate or the like. Furthermore, the zeolite particles can be prevented from being excessively adhered to each other in a zeolite slurry so as to avoid an increase in viscosity of the slurry, and gelation of the zeolite slurry and aggregation of zeolite particles can be controlled during a long time storing. Furthermore, adhering force of the HC adsorbing material layer 11 to the substrate 10 and to the catalyst component layer 12 is increased thereby preventing the HC adsorbing material layer 12 from peeling off from the substrate (such as the monolithic substrate) and preventing adjacent layers from peeling off from the HC adsorbing layer even after the exhaust gas purifying catalyst undergoes a long time heat history. Thus, the HC adsorbing material layer can be suppressed in its degradation throughout a long period of time.

Here, zeolite used in the HC adsorbing material layer 11 is suitably selected from known zeolites, and preferably has a high HC adsorbing ability within a relatively wide temperature range of from ordinary temperature to a relatively high temperature (for example 100° C.), though the temperature range changes depending upon evaluation conditions, even in an atmosphere containing water, a wide HC adsorbing ability which can cope with a variety of kinds of hydrocarbons molecules having different molecular sizes, and a high durability (structural stability) after a long time use or a durability test. An example of such preferable zeolite is β-zeolite, particularly β-zeolite having a Si/2Al ratio ranging from 20 to 2000. In case that the Si/2Al ratio is not lower than 20, β-zeolite is high in heat resistance. In case that the Si/2Al ratio is not higher than 2000, a further heat resistance improvement effect can be obtained while releasing of HC from β-zeolite cannot be largely sped up thereby improving a HC oxidizing ability of the exhaust gas purifying catalyst.

Additionally, the zeolite contained in the HC adsorbing material layer may be used together with an auxiliary material such as MFY (zeolite), Y-type zeolite, USY-type zeolite and/or mordenite which are different from each other in diameter and structure of fine pores formed in the zeolite. In other words, the zeolite contained in the HG adsorbing material layer contains β-zeolite mixed with the auxiliary material including at least one of MFY (zeolite), Y-type zeolite, USY-type zeolite and/or mordenite selected in accordance with the composition of exhaust gas discharged from the engine. With this arrangement, the HC adsorbing material layer can exhibit a wide range of HC adsorbing ability coping with a variety of kinds of hydrocarbons having different molecular sizes or diameters. Preferably, the HC adsorbing material layer 11 contains the auxiliary material (including MFY, Y-type zeolite, USY-type zeolite and/or mordenite) in an amount ranging from 5 to 50% by weight relative to total zeolites contained in the HC adsorbing material layer. If the amount of the auxiliary material is less than 5% by weight, the effect due to addition of the auxiliary material cannot be sufficiently obtained. If the amount of the auxiliary material exceeds 50% by weight, a total amount of HC adsorbed by the HC adsorbing material layer may be lowered.

Furthermore, the above various zeolites are preferably subjected to a treatment for providing a hydrophobic property with mesoporous silica. More preferably) β-zeolite having the Si/2Al ratio ranging from 20 to 2000 is subjected to the hydrophobic property providing treatment, by which the zeolite is improved in heat resistance and stabilized in crystal structure thereby exhibiting a high hydrocarbons adsorbing ability throughout a wide range including an initial time of use to a time after a long time use (or a durability test). If the Si/2Al ratio is lower than 20, a sufficient durability cannot be provided to the zeolite (β-zeolite). Even if the Si/2Al ratio exceeds 2000, an effect of improving the durability is saturated while the HC releasing ability may tend to lower. Meant by the hydrophobic property providing treatment with mesoporous silica is a treatment in which the zeolite (particle) is impregnated with fine particles of mesoporous silica so that mesoporous silica is carried on the zeolite (particle).

The above various zeolites may contain palladium (Pd), magnesium (Mg), calcium (Ca), strontium (Sr), barium (Ba), silver (Ag), yttrium (Y), lanthanum (La), cerium (Ce), neodymium (Nd), phosphorus (P), boron (B) and/or zirconium (Zr). It will be understood that any mixture of these elements may be contained in the zeolites. By virtue of these elements, the zeolites can be improved in adsorbing ability for HC having small molecular diameters which HC are difficult to be absorbed singly by the zeolites, while exhibiting a high HC adsorbing ability throughout a wide range covering an initial time of use to a time after a long time use (or a durability test) Additionally, by virtue of these elements, releasing of adsorbed HC can be retarded, and therefore a HC releasing-suppressing ability of the zeolites can be improved, thereby further improving the HC oxidizing ability of the exhaust gas purifying catalyst. The above-listed elements Pd, Mg, Ca, Sr, Ba, Ag, Y, La, Ce, Nd, P, B and/or Zr are contained preferably in an amount ranging from 1 to 20% by weight relative to the amount of total zeolites in the HC adsorbing material layer. If the amount (content) is less than 1% by weight, the above improvement effects cannot be obtained. If the amount exceeds 20% by weight, the fine pores of the zeolites tend to be blocked so that the HC adsorbing ability may be degraded. The above-listed elements can be carried on the zeolites by usual methods such as ion exchange method, impregnation method and dipping method.

Next, the catalyst component layer 12 will be discussed in detail.

The catalyst component layer 12 preferably contain palladium (Pd), platinum (Pt) and/or rhodium (Rh). It will be understood any mixture of these elements can contained in the catalyst component layer 12. These catalyst (metal) components functioning oxidation for HC are in close contact with the zeolites in the HC adsorbing material layer, so that HC released from the HC adsorbing material layer can be readily oxidized at a high efficiency. In other words, if the catalyst component layer 12 contains Pd which is good in low temperature activity for HC, HC released from the zeolites can be preferentially oxidized. Additionally, if the catalyst component layer 12 contains both Pd and Rh, HC, CO and NOx can be oxidized and reduced in a high balance even in case that exhaust gas whose air-fuel ratio slightly shifts to the rich region relative to the stoichiometric value flows to the exhaust gas purifying catalyst. Further, if the catalyst component layer 12 contains Pt, poisoning of the exhaust gas purifying catalyst can be effectively prevented. The above catalyst metal components exhibit the function of three-way catalyst for oxidizing HC and CO and reducing NOx, and preferably are contained in an amount ranging from 0.01 to 10 g per one liter of the exhaust gas purifying catalyst or a monolithic substrate in case the HC adsorbing material layer 11 and the catalyst component layer 12 are formed on the monolithic substrate. If the amount (content) is less than 0.01 g per one liter of the catalyst, the above improvement effects cannot be sufficiently obtained. Even if the amount (content) exceeds 10 g per one liter of the catalyst, the above improvement effects may be saturated.

Further, the catalyst component layer 12 may contain alkali metal and/or alkaline earth metal. This particularly softens poisoning to palladium due to HC adsorption, thereby improving the catalytic activity of the catalyst component layer at low temperatures. Examples of alkali metal and alkaline earth metal are potassium (K), sodium (Na), cesium (Cs), magnesium (Mg), calcium (Ca), strontium (Sr) and barium (Ba). It will be understood that any mixture of these metals can be contained in the catalyst component layer 12. Of these metals, Ba is the most preferable.

As discussed above, in the exhaust gas purifying catalyst, the HC adsorbing material layer 11 and the catalyst component layer 12 form a wash coat layer structure (on the substrate) which is well balanced in performance for oxidizing HC and CO and reducing NOx. The substrate is preferably a monolithic substrate such as a honeycomb-type monolithic substrate formed of refractory material (ceramic) or formed of metal. Particularly for purifying exhaust gas discharged from the automotive internal combustion engine, the honeycomb-type monolithic substrates 10 as shown in FIGS. 3A and 3B are preferably used for the exhaust gas purifying catalyst, so that the contact area between the catalyst and exhaust gas is enlarged while suppressing a rise in pressure loss of exhaust gas passing through the exhaust gas purifying catalyst and being endurable to vibration and friction. The honeycomb-type monolithic substrate 10 is preferably formed of cordierite ceramic and may be ferrite stainless steel. Otherwise, powder material containing the catalyst (metal) components may be directly formed into a honeycomb-shaped structure thereby to form an exhaust gas purifying catalyst similar to that of the present invention..

Although the exhaust gas purifying catalyst of the present invention itself can exhibit a high exhaust gas purifying performance, it may be used in combination with a usual or conventional three-way catalyst as shown in FIG. 4 to constitute an exhaust gas purifying system for providing a further high exhaust gas purifying performance. More specifically, the exhaust gas purifying catalyst 23 of the present invention is disposed as a catalytic converter in an exhaust gas passageway 21 which is connected to an internal combustion engine 20 of an automotive vehicle. The conventional three-way catalyst 22 is disposed as a catalytic converter in the exhaust gas passageway 21 upstream of the exhaust gas purifying catalyst 23. In other words, the three-way catalyst 22 is disposed between the engine 20 and the catalyst 23. With the thus arranged exhaust gas purifying system, a high adsorbing and removing performance for HC and NOx can be exhibited in a so-called cold lean region of exhaust gas, established, for example, at engine starting, thus remarkably improving a purifying efficiency for exhaust gas.

In order to produce the exhaust gas purifying catalyst of the present invention, first the coating liquid or slurry containing zeolite and colloidal silica is coated on the substrate thereby to form the HC adsorbing material layer. Thereafter, a coating liquid or slurry containing catalyst (metal) component is coated on the HC adsorbing material layer thereby to form the catalyst component layer. The coating liquid is prepared by mixing the (colloidal) silica particles or the catalyst metal(s) with water or the like, followed by stirring.

EXAMPLES

The present invention will be more readily understood with reference to the following Examples; however, these Examples are intended to illustrate the invention and are not to be construed to limit the scope of the invention.

Example 1

A porcelain ball mill was charged with 475 g of β-zeolite powder (Si/2Al=50), 125 g of colloidal silica (having a solid content of 20% by weight and having a trade name of ST-UP and produced by Nissan Chemical Industries, Ltd.) whose particles were chain and whose average particle size was within a range of from 40 to 100 nm, and 1000 g of pure water, followed by mixing and pulverization, thereby obtaining a slurry. This slurry was coated on a cordierite ceramic honeycomb-type monolithic substrate having a volume of 1.3 liters, 600 (axially extending) cells per square inch and having a thickness of walls (defining each cell) of 4 mil, so that thin walls of cells were coated with the slurry. Thereafter, the coated monolithic substrate was blown with air stream to remove excessive slurry in the cells, and dried and then fired at 400° C. for 1 hour, thereby forming a coat layer (zeolite-base layer). The above procedure from coating to calcining was repeated until the weight of the coat layer became 250 g per one liter of the monolithic substrate. Thus, a catalyst 1a was prepared.

Alumina powder containing 3 mol % of Ce was impregnated with an aqueous solution of palladium nitrate, followed by drying at 150° C. for 24 hours. The thus dried alumina powder was fired at 400° C. for 1 hour and then 600° C. for 1 hour thereby obtaining a Pd-carried alumina powder (Powder a) having a Pd concentration of 8.0% by weight.

Cerium oxide powder containing 1 mol % of La and 32 mol % of Zr was impregnated with an aqueous solution of dinitrodiammine palladium, followed by drying at 150° C. for 24 hours. The thus dried cerium oxide powder was fired at 400° C. for 1 hour and then 600° C. for 1 hour thereby obtaining a Pd-carried cerium oxide powder (Powder b) having a Pd concentration of 4.0% by weight.

A porcelain ball mill was charged with 400 g of the Pd-carried alumina powder (Powder a), 141 g of the Pd-carried cerium oxide powder (Powder b), 64 g of barium carbonate powder, 9.3 g of nitric acid-acidic alumina sol (or sol obtained by adding 10% nitric acid to 10% by weight of boehmite alumina), and 1000 g of pure water, followed by mixing and pulverizing, thereby obtaining a slurry. This slurry was coated on the above catalyst 1a. Thereafter, the coated catalyst 1a was blown with air stream to remove excessive slurry in the cells, and dried and then fired at 400° C. for 1 hour, thereby forming a coat layer. The above procedure from coating to calcining was repeated until the weight of the coat layer became 60 g per one liter of the monolithic substrate. Thus, a catalyst 1b was prepared.

Alumina powder containing 3% by weight of Zr was impregnated with an aqueous solution of rhodium nitrate, followed by drying at 150° C. for 24 hours. Subsequently, the thus dried alumina powder was fired first at 400° C. for 1 hour and then at 600° C. for 1 hour thereby obtaining Rh-carrying alumina powder (Powder c) whose Rh concentration was 5.0% by weight.

Alumina powder containing 3 mol % of Ce was impregnated with an aqueous solution of dinitrodiammine platinum, followed by drying at 150° C. for 24 hours. Subsequently, the thus dried alumina powder was fired first at 400° C. for 1 hour and then at 600° C. for 1 hour thereby obtaining Pt-carrying alumina powder (Powder d) whose Pt concentration was 5.0% by weight.

A porcelain ball mill was charged with 283 g of the Rh-carried alumina powder (Powder c), 94 g of the Pt-carried alumina powder (Powder d), 100 g of zirconium oxide powder containing 1 mol % of La and 20 mol % of Ce, and 23 g of the nitric acid-acidic alumina sol, followed by mixing and pulverizing, thereby obtaining a slurry. This slurry was coated on the above catalyst 1b. Thereafter, the coated catalyst 1b was blown with air stream to remove excessive slurry in the cells, and dried and then fired at 400° C. for 1 hour, thereby forming a coat layer. The above procedure from coating to calcining was repeated until the weight of the coat layer became 50 g (the total weight of the coat layers became 360 g) per one liter of the monolithic substrate. Thus, an exhaust gas purifying catalyst (Catalyst 1c) of Example 1 was produced.

Example 2

A porcelain ball mill was charged with 400 g of γ-alumina, 1000 g of nitric acid-acidic alumina sol (prepared by adding 10% (wt) nitric acid to 10% by weight of boehmite alumina) and 500 g of pure water, followed by mixing and pulverizing, thereby obtaining a slurry. This slurry was coated on a cordierite ceramic honeycomb-type monolithic substrate having a volume of 1.3 liters, 600 (axially extending) cells per square inch and having a thickness of walls (defining each cell) of 4 mil, so that thin walls of cells were coated with the slurry. Thereafter, the coated monolithic substrate was blown with air stream to remove excessive slurry in the cells, and dried and then fired at 400° C. for 1 hour, thereby forming a coat layer (alumina-base layer). The above procedure from coating to calcining was repeated until the weight of the coat layer became 100 g per one liter of the monolithic substrate after calcining. Thus, a catalyst 2a was prepared.

A porcelain ball mill was charged with 450 g of β-zeolite powder (Si/2Al=1500), 250 g of colloidal silica (having a solid content of 20% by weight and having a trade name of ST-UP and produced by Nissan Chemical Industries, Ltd.) whose particles were chain and whose average particle size was within a range of from 40 to 100 nm, and 1000 g of pure water, followed by mixing and pulverization, thereby obtaining a slurry. This slurry was coated on the catalyst 2a, so that thin walls of cells were coated with the slurry. Thereafter, the coated catalyst 2a was blown with air stream to remove excessive slurry in the cells, and dried and then fired at 400° C. for 1 hour, thereby forming a coat layer (zeolite-base layer) containing zeolite. The above procedure from coating to calcining was repeated until the weight of the coat layer became 150 g (the total weight of the coat layers became 250 g) per one liter of the monolithic substrate. Thus, a catalyst 2b was prepared.

A porcelain ball mill was charged with 283 g of the Rh-carried alumina powder (Powder c in Example 1), 94 g of the Pt-carried alumina powder (Powder d in Example 1), 100 g of zirconium oxide powder containing 1 mol % of La and 20 mol % of Ce, and 23 g of the nitric acid-acidic alumina sol, followed by mixing and pulverizing, thereby obtaining a slurry. This slurry was coated on the above catalyst 2b. Thereafter, the coated catalyst 2b was blown with air stream to remove excessive slurry in the cells, and dried and then fired at 400° C. for 1 hour, thereby forming a coat layer. The above procedure from coating to calcining was repeated until the weight of the coat layer became 50 g (the total weight of the coat layers became 360 g) per one liter of the monolithic substrate. Thus, an exhaust gas purifying catalyst (Catalyst 2c) of Example 2 was produced.

Example 3

An exhaust gas purifying catalyst of Example 3 was produced by repeating the procedure of Example 1 with the exception that 450 g of β-zeolite powder (Si/2Al=25), 200 g of colloidal silica (having a solid content of 20% by weight and having a trade name of ST-UP and produced by Nissan Chemical Industries, Ltd.) whose particles were chain and whose average particle size was within a range of from 40 to 100 nm, and 50 g of colloidal silica (having a solid content of 20% by weight and having a trade name of ST-O and produced by Nissan Chemical Industries, Ltd.) whose particles were spherical and whose average particle size was within a range of from 10 to 20 nm were used in place of β-zeolite powder and colloidal silica in Example 1.

Example 4

An exhaust gas purifying catalyst of Example 4 was produced by repeating the procedure of Example 1 with the exception that 450 g of β-zeolite powder (Si/2Al=300), 150 g of colloidal silica (having a solid content of 20% by weight and having a trade name of ST-UP and produced by Nissan Chemical Industries, Ltd.) whose particles were chain and whose average particle size was within a range of from 40 to 100 nm, and 67 g of colloidal silica (having a solid content of 30% by weight and having a trade name of ST-S) and produced by Nissan Chemical Industries, Ltd.) whose particles were spherical and whose average particle size was within a range of from 8 to 11 nm were used in place of β-zeolite powder and colloidal silica in Example 1.

Example 5

An exhaust gas purifying catalyst of Example 5 was produced by repeating the procedure of Example 1 with the exception that 300 g of β-zeolite powder (Si/2Al=150), 150 g of colloidal silica (having a solid content of 20% by weight and having a trade name of ST-UP and produced by Nissan Chemical Industries, Ltd.) whose particles were chain and whose average particle size was within a range of from 40 to 100 nm, 50 g of colloidal silica (having a solid content of 20% by weight and having a trade name of ST-O and produced by Nissan Chemical Industries, Ltd.) whose particles were spherical and whose average particle size was within a range of from 10 to 20 nm, and 50 g of colloidal silica (having a solid content of 20% by weight and having a trade name of ST-S and produced by Nissan Chemical Industries, Ltd.) whose particles were spherical and whose average particle size was within a range of from 8 to 11 nm were used in place of β-zeolite powder and colloidal silica in Example 1.

Example 6

An exhaust gas purifying catalyst of Example 6 was produced by repeating the procedure of Example 1 with the exception that 250 g of β-zeolite powder (Si/2Al=75), and 1667 g of colloidal silica (having a solid content of 15% by weight and having a trade name of ST-OUP and produced by Nissan Chemical Industries, Ltd.) whose particles were chain and whose average particle size was within a range of from 40 to 100 nm were used in place of β-zeolite powder and colloidal silica in Example 1.

Example 7

An exhaust gas purifying catalyst of Example 7 was produced by repeating the procedure of Example 1 with the exception that 300 g of β-zeolite powder (Si/2Al=75), 25 g of MFI (Si/2Al=200) powder, 25 g of mordenite powder, 750 g of colloidal silica (having a solid content of 20% by weight and having a trade name of ST-UP and produced by Nissan Chemical Industries, Ltd.) whose particles were chain and whose average particle size was within a range of from 40 to 100 nm were used in place of β-zeolite powder and colloidal silica in Example 1.

Example 8

An exhaust gas purifying catalyst of Example 8 was produced by repeating the procedure of Example 1 with the exception that 200 g of β-zeolite powder (Si/2Al=300), 50 g of MFI (Si/2Al=200) powder, 50 g of Y-type zeolite powder (Si/2Al=30), 50 g of USY-type zeolite powder (Si/2Al=80), 50 g of mordenite powder, 500 g of colloidal silica (having a solid content of 20% by weight and having a trade name of ST-UP and produced by Nissan Chemical Industries, Ltd.) whose particles were chain and whose average particle size was within a range of from 40 to 100 nm, and 250 g of colloidal silica (having a solid content of 20% by weight and having a trade name of ST-O and produced by Nissan Chemical Industries, Ltd.) whose particles were spherical and whose average particle size was within a range of from 10 to 20 nm were used in place of β-zeolite powder and colloidal silica in Example 1.

Example 9

An exhaust gas purifying catalyst of Example 9 was produced by repeating the procedure of Example 1 with the exception that 350 g of β-zeolite powder (Si/2Al=75) which had carried 1% by weight of Ag and 0.5% by weight of P, 50 g of MFI powder which had carried 0.5% by weight of Pd, and 500 g of colloidal silica (having a solid content of 20% by weight and having a trade name of ST-UP and produced by Nissan Chemical Industries, Ltd.) whose particles were chain and whose average particle size was within a range of from 40 to 100 nm were used in place of β-zeolite powder and colloidal silica in Example 1.

Example 10

An exhaust gas purifying catalyst of Example 10 was produced by repeating the procedure of Example 1 with the exception that 340 g of β-zeolite powder (H-type, Si/2Al=75), 10 g of β-zeolite powder (H-type, Si/2Al=75) which had carried 1% by weight of Ag and 0.5% by weight of P, 10 g of β-zeolite powder (H-type, Si/2Al=75) which had carried 0.01% by weight of Mg, 0.01% by weight of Ce, 0.01% by weight of Zr, 10 g of MFI powder which had carried 0.01% by weight of Ca, 0.01% by weight of Y and 0.01% by weight of B, 10 g of mordenite powder which had carried 0.2% by weight of Pd, 10 g of Y-type zeolite powder which had carried 0.01% by weight of Sr and 0.01% by weight of La, 10 g of USY-type zeolite powder which had carried 0.01% by weight of Ba and 0.01% by weight of Nd, and 500 g of colloidal silica (having a solid content of 20% by weight and having a trade name of ST-UP and produced by Nissan Chemical Industries, Ltd.) whose particles were chain and whose average particle size was within a range of from 40 to 100 nm were used in place of β-zeolite powder and colloidal silica in Example 1.

Example 11

An exhaust gas purifying catalyst of Example 11 was produced by repeating the procedure of Example 6 with the exception that 500 g of colloidal silica (having a solid content of 20% by weight and having a trade name of ST-O and produced by Nissan Chemical Industries, Ltd.) whose particles were spherical and whose average particle size was within a range of from 10 to 20 nm, 250 g of colloidal silica (having a solid content of 20% by weight and having a trade name of ST-XS and produced by Nissan Chemical Industries, Ltd.) whose particles were spherical and whose average particle size was within a range of from 4 to 6 nm, and 500 g of colloidal silica (having a solid content of 20% by weight and having a trade name of ST-UP and produced by Nissan Chemical Industries, Ltd.) whose particles were chain and whose average particle size was within a range of from 40 to 100 nm were used in place of colloidal silica in Example 6.

Example 12

An exhaust gas purifying catalyst of Example 12 was produced by repeating the procedure of Example 6 with the exception that 125 g of colloidal silica (having a solid content of 20% by weight and having a trade name of ST-XS and produced by Nissan Chemical Industries, Ltd.) whose particles were spherical and whose average particle size was within a range of from 4 to 6 nm was used in place of colloidal silica in Example 6.

Example 13

An exhaust gas purifying catalyst of Example 13 was produced by repeating the procedure of Example 6 with the exception that 125 g of colloidal silica or silica sol (having a solid content of 20% by weight and produced by Nissan Chemical Industries, Ltd.) whose particles were spherical and whose average particle size was within a range of from 80 to 120 nm was used in place of colloidal silica in Example 6.

Comparative Example 1

An exhaust gas purifying catalyst of Comparative example 1 was produced by repeating the procedure of Example 1 with the exception that the colloidal silica (having a solid content of 20% by weight and having a trade name of ST-UP and produced by Nissan Chemical Industries, Ltd.) whose particles were chain and whose average particle size was within a range of from 40 to 100 nm was not used.

Comparative Example 2

An exhaust gas purifying catalyst of Comparative example 2 was produced by repeating the procedure of Example 1 with the exception that alumina sol was used in place of the colloidal silica in Example 1.

Example 14

An exhaust gas purifying catalyst of Example 14 was produced by repeating the procedure of Example 1 with the exception that 6000 g of the colloidal silica (ST-UP) was used in place of the 125 g of the colloidal silica (ST-UP) in Example 1.

Example 15

An exhaust gas purifying catalyst of Example 15 was produced by repeating the procedure of Example 1 with the exception that 50 g of the β-zeolite powder and 350 g of MFI were used in place of 475 g of the β-zeolite powder in Example 1.

Example 16

An exhaust gas purifying catalyst of Example 16 was produced by repeating the procedure of Example 1 with the exception that 400 g of Y-type zeolite was used in place of 475 g of the β-zeolite powder in Example 1.

Example 17

An exhaust gas purifying catalyst of Example 17 was produced by repeating the procedure of Example 1 with the exception that β-zeolite powder containing 25% by weight of Ag and 5% by weight of P was used in place of the β-zeolite powder in Example 1.

Comparative Example 3

An exhaust gas purifying catalyst of Comparative example 3 was produced by repeating the procedure of Example 1 with the exception that 50 g of $SiO_2$ powder having an average particle size ranging from 2 to 4 μm was used in place of 125 g of colloidal silica (ST-UP).

Details of the exhaust gas purifying catalysts obtained in Examples are shown in Tables 1 and 2, in which Table 1 includes the substrate, the alumina-base layer and the hydrocarbon adsorbing material layer, while Table 2 includes the catalyst component layer. A representation "g/l." indicates the weight (g) per one liter of the monolithic carrier (or of the exhaust gas purifying catalyst).

Evaluation of Performance of Exhaust Gas Purifying System (1) Durability Test First, the exhaust gas purifying catalysts of Examples and Comparative examples underwent a durability test in which each exhaust gas purifying catalyst was disposed in an exhaust gas passageway connected to an internal combustion engine. In the durability test, the engine was operated under the following test conditions:

Displacement of the engine: 3,000 cc;

Fuel: "Nisseki Dasshu Gasoline" produced by Nippon Oil Co., Ltd. and having a Pb content of 0 mg/usg (U.S. gallon) and a S content of not more than 30 ppm;

Temperature of exhaust gas to be supplied to the catalyst: 650° C.; and

Time of operation of the engine: 50 hours.

After this durability test, a "peeling amount (weight) of coat layers during durability test (the amount of a part of the coat layers lost during the durability test)" was determined for each exhaust gas purifying catalyst and converted into a value (weight) per one liter of the catalyst or monolithic substrate, as shown in Table 3.

(2) LA-4CH (A-Bag) Test

After the durability test, a "HC adsorbing rate (%) under cold engine operation" and an "oxidizing rate (%) for desorbed HC" for the exhaust gas purifying catalysts of Examples and Comparative examples were measured under a test mode "LA-4CH (A-bag)" employed in the U.S.A. In this test, each exhaust gas purifying catalyst was incorporated in an evaluation engine system as shown in FIG. 4. In the evaluation engine system, each exhaust gas purifying catalyst was disposed at the location of the catalyst 23, in which the engine was operated under the following conditions:

Volume of catalysts:
   Three-way catalyst (22): 1.3 liters; and
   Exhaust gas purifying catalyst (23): 1.3 liters;
Engine: V-type 6-cylinder engine (having a displacement of 3.3 liters) produced by Nissan Motor Co., Ltd.; and
Hydrocarbons (the number of carbons) discharged from the engine during engine starting:
   C2–C3: 21.0%
   C4–C6: 33.0%
   C7–C9: 40.0%

The HC adsorbing rate (%) under cold engine operation means the rate of the amount of HC adsorbed by the exhaust gas purifying catalyst (23 in FIG. 4) relative to the amount of HC discharged from the engine during so-called cold starting (engine starting in a cold condition of the engine). The oxidizing rate (%) for desorbed HC means that the rate (%) of the amount of HC oxidized by the exhaust gas purifying catalyst (23) relative to the amount of HC adsorbed by (or desorbed from) the exhaust gas purifying catalyst (23).

(3) Emission Performance Evaluation Test

An emission performance evaluation test was conducted on the exhaust gas purifying catalysts of Examples and Comparative examples, by incorporating each exhaust gas purifying catalyst at the location of the catalyst 23 in the evaluation engine system as shown in FIG. 4. In the emission performance evaluation test, the engine was operated under the test mode "LA-4CH (A-bag)" and in the following conditions:

Displacement of the engine: 2,000 cc;
Fuel: "Nisseki Dasshu Gasoline" produced by Nippon Oil Co., Ltd. and having a Pb content of 0 mg/usg (U.S. gallon) and a S content of not more than 30 ppm;
Temperature of gas to be supplied to the catalyst (23): 450° C.; and
Air-fuel ratio (A/F) of air-fuel mixture supplied to the engine: Center (A/F)=14.6; and Amplitude (ΔA/F)= ±1.0.

During this test using the evaluation engine system of FIG. 4, a concentration A (accumulated or total value) of each of gas components (HC, CO and NOx) in exhaust gas from the engine was measured in a state where no exhaust gas purifying catalyst (23) was provided, and a concentration B (accumulated or total value) of each of the gas components in exhaust gas emitted through the exhaust gas purifying catalyst (23) was measured, so as to determine a "conversion rate (%)" of the respective gas components, as shown in Table 3. The concentrations were measured as "ppm". The conversion rate (%) of the respective gas components were calculated by the following equations:

HC conversion rate (%)=[(the concentration A of a gas component (HC)–the concentration B of the gas component (HC)/the concentration A of a gas component (HC))×100];

CO conversion rate (%)=[(the concentration A of a gas component (CO)–the concentration B of the gas component (CO)/the concentration A of the gas component (CO))×100]; and NOx conversion rate (%)=[(the concentration A of a gas component (NOx)–the concentration B of the gas component (NOx)/the concentration A of the gas component (HC))×100].

As apparent from Tables 1 to 3, the exhaust gas purifying catalysts of Examples 1 to 13 are excellent in HC adsorbing rate and in oxidizing rate for desorbed HC in the cold engine operation range, and less in peeling amount of coat layers during durability test. Additionally, the exhaust gas purifying catalysts of Examples 1 to 13 are high in conversion rates for HC, CO and NOx even after the durability test.

The exhaust gas purifying catalyst of Comparative example 1 did not use colloidal, and the exhaust gas purifying catalyst of Comparative example 2 did not contain colloidal silica in the HC adsorbing material layer. Accordingly, they are low in HC adsorbing rate in the cold engine operation range and high in peeling amount of coat layers during durability test, and low in conversion rates for the exhaust gas components, as compared with those of Examples 1 to 13.

The exhaust gas purifying catalyst of Example 14 contained colloidal silica (specifically $SiO_2$) in an amount of 50% by weight; the exhaust gas purifying catalyst of Example 15 contained β-zeolite in an amount exceeding 50% by weight relative to total zeolites; the exhaust gas purifying catalyst of Example 16 did not use β-zeolite; and the exhaust gas purifying catalyst of Example 17 contains zeolite whose content of elements (Ag and P) reaches 20% by weight. However, they are sufficient in performances though they are low in performance as compared with the exhaust gas purifying catalysts of Examples 1 to 13. The exhaust gas purifying catalyst of Comparative example 3 contained oxide powder having too small particle sizes, and therefore it is low in HC adsorbing rate as compared with those of Examples.

As appreciated from the above, according to the present invention, the exhaust gas purifying catalyst includes a HC adsorbing material layer which contains zeolite and colloidal silica (in a state of having been fired). Therefore, the exhaust gas purifying catalyst can effectively oxidize or remove a high concentration of HC emitted in a cold engine operation range or immediately after engine starting while effectively preventing a HC adsorbing material (including a HC adsorbing catalyst component) and/or a catalyst component (including a three-way catalyst component) from peeling off and separating from a substrate even after a long time use of the exhaust gas purifying catalyst, thus effectively purifying exhaust gas throughout a long period of time.

The entire contents of Japanese Patent Application P2000-125696 (filed Apr. 26, 2000) are incorporated herein by reference.

Although the invention has been described above by reference to certain embodiments or examples of the invention, the invention is not limited to the embodiments or examples described above. Modifications and variations of the embodiments or examples described above will occur to those skilled in the art, in light of the above teachings. The scope of the invention is defined with reference to the following claims.

TABLE 1

| Sample | Substrate (cells/mil) | Alumina-base layer (g/l.) | Kind of zeolite | Si/2Al | Sol amount (wt %) of colloidal silica | Particle structure of colloidal silica | Average particle size (nm) | Zeolite-base layer (g/l.) | Element(s) contained in zeolite (wt %) |
|---|---|---|---|---|---|---|---|---|---|
| Example 1 | 600/4 | — | β | 50 | 5.0 | Chain | 40~100 | 250 | — |
| Example 2 | 600/4 | 100 | β | 1500 | 10.0 | Chain | 40~100 | 250 | — |
| Example 3 | 600/4 | — | β | 25 | 10.0 | Chain (80%) Spherical (20%) | 40~100 10~20 | 250 | — |
| Example 4 | 600/4 | — | β | 300 | 10.0 | Chain (60%) Spherical (40%) | 40~100 8~11 | 250 | — |
| Example 5 | 600/4 | — | β | 150 | 10.0 | Chain (60%) Spherical (20%) Spherical (20%) | 40~100 10~20 8~11 | 250 | — |
| Example 6 | 600/4 | — | β | 75 | 50.0 | Chain | 40~100 | 250 | — |
| Example 7 | 600/4 | — | β MFI Mordenite | 75 200 80 | 30.0 | Chain | 40~100 | 250 | — |
| Example 8 | 600/4 | — | β MFI Y USY Mordenite | 300 200 30 80 80 | 20.0 | Chain (67%) Spherical (33%) | 40~100 | 250 | — |
| Example 9 | 600/4 | — | β | 75 | 20.0 | Chain | 40~100 | 250 | Ag 1% P 0.5% |
| Example 10 | 600/4 | — | β β MFI Mordenite Y USY | 75 75 200 80 30 80 | 20.0 | Chain | 40~100 | 250 | Ag 1% P 0.5% Mg 0.01% Ce 0.01% Zr 0.01% Ca 0.01% Y 0.01% B 0.01% Pd 0.2% Sr 0.01% La 0.01% Ba 0.01% Nd 0.01% |
| Example 11 | 600/4 | — | β | 75 | 50.0 | Spherical (40%) Spherical (20%) Chain (40%) | 10~20 4~6 10~20 | 250 | — |
| Example 12 | 600/4 | — | β | 50 | 5.0 | Spherical | 4~6 | 250 | — |
| Example 13 | 600/4 | — | β | 50 | 5.0 | Spherical | 80~120 | 250 | — |
| Comp. Example 1 | 600/4 | — | β | 50 | 0.0 | Nil | — | 250 | — |
| Comp. Example 2 | 600/4 | — | β | 50 | Alumina sol 5% | — | — | 250 | — |
| Example 14 | 600/4 | — | β | 50 | 71.6 | Chain | 40~100 | 250 | — |
| Example 15 | 600/4 | — | β MFI | 50(10%) 200(85%) | 5.0 | Chain | 40~100 | 250 | — |
| Example 16 | 600/4 | — | Y | 20 | 5.0 | Chain | 40~100 | 250 | — |
| Example 17 | 600/4 | — | β | 50 | 5.0 | Chain | 40~100 | 250 | Ag 15% P 5% |
| Comp. Example 3 | 600/4 | — | β | 50 | 5.0 | Oxide powder | 2~4μm | 250 | — |

TABLE 2

| | Catalyst component layer | | | | | |
|---|---|---|---|---|---|---|
| Sample | Pd (g/l.) | Pt (g/l.) | Rh (g/l.) | Cerium oxide (g/l.) | Zirconium Oxide (g/l.) | Alkaline earth metal (g/l.) |
| Example 1 | 3.76 | 0.47 | 1.42 | 13.5 | 10.0 | 5.0 |
| Example 2 | 3.76 | 0.47 | 1.42 | 13.5 | 10.0 | 5.0 |
| Example 3 | 3.76 | 0.47 | 1.42 | 13.5 | 10.0 | 5.0 |
| Example 4 | 3.76 | 0.47 | 1.42 | 13.5 | 10.0 | 5.0 |
| Example 5 | 3.76 | 0.47 | 1.42 | 13.5 | 10.0 | 5.0 |
| Example 6 | 3.76 | 0.47 | 1.42 | 13.5 | 10.0 | 5.0 |
| Example 7 | 3.76 | 0.47 | 1.42 | 13.5 | 10.0 | 5.0 |
| Example 8 | 3.76 | 0.47 | 1.42 | 13.5 | 10.0 | 5.0 |
| Example 9 | 3.76 | 0.47 | 1.42 | 13.5 | 10.0 | 5.0 |
| Example 10 | 3.76 | 0.47 | 1.42 | 13.5 | 10.0 | 5.0 |
| Example 11 | 3.76 | 0.47 | 1.42 | 13.5 | 10.0 | 5.0 |
| Example 12 | 3.76 | 0.47 | 1.42 | 13.5 | 10.0 | 5.0 |
| Example 13 | 3.76 | 0.47 | 1.42 | 13.5 | 10.0 | 5.0 |

TABLE 2-continued

| | Catalyst component layer | | | | | |
|---|---|---|---|---|---|---|
| Sample | Pd (g/l.) | Pt (g/l.) | Rh (g/l.) | Cerium oxide (g/l.) | Zirconium Oxide (g/l.) | Alkaline earth metal (g/l.) |
| Comp. Example 1 | 3.76 | 0.47 | 1.42 | 13.5 | 10.0 | 5.0 |
| Comp. Example 2 | 3.76 | 0.47 | 1.42 | 13.5 | 10.0 | 5.0 |
| Example 14 | 3.76 | 0.47 | 1.42 | 13.5 | 10.0 | 5.0 |
| Example 15 | 3.76 | 0.47 | 1.42 | 13.5 | 10.0 | 5.0 |
| Example 16 | 3.76 | 0.47 | 1.42 | 13.5 | 10.0 | 5.0 |
| Example 17 | 3.76 | 0.47 | 1.42 | 13.5 | 10.0 | 5.0 |
| Comp. Example 3 | 3.76 | 0.47 | 1.42 | 13.5 | 10.0 | 5.0 |

TABLE 3

| | LA-4CH (A-bag) | | | | | |
|---|---|---|---|---|---|---|
| Sample | Peeling amount of coat layers during durability test (g/l.) | HC adsorption rate under cold engine operation (%) | Oxidizing rate for desorbed HC (%) | Converstion Rate | | |
| | | | | HC (%) | CO (%) | NOx (%) |
| Example 1 | 1.5 | 78 | 34 | 97 | 96 | 91 |
| Example 2 | 1.1 | 79 | 35 | 97 | 96 | 90 |
| Example 3 | 1.2 | 78 | 36 | 96 | 96 | 91 |
| Example 4 | 3.5 | 77 | 35 | 95 | 96 | 91 |
| Example 5 | 2.4 | 78 | 35 | 95 | 97 | 91 |
| Example 6 | 1.5 | 77 | 35 | 97 | 96 | 91 |
| Example 7 | 1.5 | 82 | 36 | 98 | 97 | 92 |
| Example 8 | 1.4 | 83 | 35 | 97 | 98 | 92 |
| Example 9 | 1.3 | 82 | 36 | 97 | 98 | 91 |
| Example 10 | 1.5 | 83 | 35 | 98 | 97 | 94 |
| Example 11 | 2.9 | 78 | 35 | 96 | 98 | 92 |
| Example 12 | 4.3 | 70 | 30 | 91 | 92 | 85 |
| Example 13 | 9.5 | 63 | 28 | 89 | 90 | 81 |
| Comp. Example 1 | 25.6 | 65 | 15 | 75 | 83 | 70 |
| Comp. Example 2 | 18.5 | 70 | 21 | 77 | 84 | 72 |
| Example 14 | 1.3 | 55 | 34 | 96 | 95 | 88 |
| Example 15 | 1.5 | 58 | 35 | 96 | 95 | 90 |
| Example 16 | 1.5 | 53 | 34 | 95 | 95 | 90 |
| Example 17 | 1.6 | 67 | 35 | 96 | 96 | 91 |
| Comp. Example 3 | 38.1 | 51 | 15 | 58 | 78 | 60 |

What is claimed:

1. An exhaust gas purifying catalyst comprising:
   a substrate;
   a hydrocarbons adsorbing material layer for adsorbing hydrocarbons contained in exhaust gas, said hydrocarbons adsorbing material layer being formed as a lower layer over said substrate and containing zeolite and colloidal silica which has undergone calcining, said colloidal silica being in at least one of a chain structure and a spherical structure before and after the calcining; and
   a catalyst component layer formed as an upper layer over said hydrocarbons adsorbing material layer, said catalyst component layer containing a catalyst metal.

2. An exhaust gas purifying catalyst as claimed in claim 1, wherein said colloidal silica has an average particle size ranging from 5 to 100 nm before the calcining.

3. An exhaust gas purifying catalyst as claimed in claim 1, wherein said colloidal silica is contained in an amount ranging from 1 to 50% by weight relative to said hydrocarbons adsorbing layer after the calcining.

4. An exhaust gas purifying catalyst as claimed in claim 1, wherein said catalyst metal is at least one metal selected from the group consisting of palladium, platinum and rhodium.

5. An exhaust gas purifying catalyst as claimed in claim 1, wherein said zeolite includes β-zeolite having a Si/Al ratio ranging from 20 to 2000.

6. An exhaust gas purifying catalyst as claimed in claim 1, wherein said zeolite includes at least one zeolite selected from the group consisting of β-zeolite having a Si/Al ratio ranging from 20 to 2000, MFI, Y-type zeolite, USY-type zeolite, and mordenite.

7. An exhaust gas purifying catalyst as claimed in claim 1, wherein said zeolite has undergone a treatment for providing hydrophobic property with mesoporous silica.

8. An exhaust gas purifying catalyst as claimed in claim 1, wherein said zeolite contains at least one element selected from the group consisting of palladium, magnesium, calcium, strontium, barium, silver, yttrium, lanthanum, cerium, neodymium, phosphorus, boron and zirconium.

9. An exhaust gas purifying catalyst as claimed in Claim 1, wherein said catalyst component layer contains at least one metal selected from the group consisting of alkali metal and alkaline earth metal.

10. An exhaust gas purifying catalyst comprising:
    a substrate;
    a hydrocarbons adsorbing material layer for adsorbing hydrocarbons contained in exhaust gas, said hydrocarbons adsorbing material layer being formed as a lower layer over said substrate and containing zeolite and silica particle, said silica particle adhering to surface of zeolite and being in at least one of a chain structure and a spherical structure; and a catalyst component layer formed as an upper layer over said hydrocarbons adsorbing material layer, said catalyst component layer containing a catalyst metal.

11. An exhaust gas purifying catalyst comprising:

a substrate;

a hydrocarbons adsorbing material layer for adsorbing hydrocarbons contained in exhaust gas, said hydrocarbons adsorbing material layer being formed as a lower layer over said substrate and containing zeolite and silica particle, said hydrocarbons adsorbing material layer being formed by coating a coating liquid containing zeolite and colloidal silica which is in at least one of a chain structure and a spherical structure, over said substrate; and a catalyst component layer formed as an upper layer over said hydrocarbons adsorbing material layer, said catalyst component layer containing a catalyst metal.

12. An exhaust gas purifying catalyst comprising:

a substrate;

a hydrocarbons adsorbing material layer for adsorbing hydrocarbons contained in exhaust gas, said hydrocarbons adsorbing material layer being formed as a lower layer over said substrate and containing zeolite and colloidal silica which has undergone calcining, said zeolite having undergone a treatment for providing hydrophobic property with mesoporous silica, said colloidal silica being in at least one of a chain structure and a spherical structure before and after the calcining, said colloidal silica having an average particle size ranging from 5 to 100 nm before the calcining, said colloidal silica being contained in an amount ranging from 1 to 50% by weight relative to said hydrocarbons adsorbing material layer after the calcining; and a catalyst component layer formed as an upper layer over said hydrocarbons adsorbing material layer, said catalyst component layer containing a catalyst metal.

13. A method of producing an exhaust gas purifying catalyst, comprising:

coating a first coating liquid over a substrate to form a hydrocarbons adsorbing material layer as a lower layer, said first coating liquid containing zeolite and colloidal silica which is in at least one of a chain structure and a spherical structure; and coating a second coating liquid on the hydrocarbons adsorbing material layer to form a catalyst component layer as an upper layer, said second coating liquid containing a catalyst metal.

* * * * *